(12) United States Patent
Zheng et al.

(10) Patent No.: US 7,258,936 B2
(45) Date of Patent: Aug. 21, 2007

(54) CONTROLLING SOLID OXIDE FUEL CELL OPERATION

(75) Inventors: Rong Zheng, Edmonton (CA); Hongsang Rho, Edmonton (CA); Luis Yamarte, Edmonton (CA); Gary J. Kovacik, Edmonton (CA); Partha Sarkar, Edmonton (CA)

(73) Assignee: Alberta Research Council, Inc., Edmonton, Alberta (CA)

( * ) Notice: Subject to any disclaimer, the term of this patent is extended or adjusted under 35 U.S.C. 154(b) by 474 days.

(21) Appl. No.: 10/971,592

(22) Filed: Oct. 21, 2004

(65) Prior Publication Data

US 2005/0112419 A1    May 26, 2005

Related U.S. Application Data

(60) Provisional application No. 60/513,398, filed on Oct. 21, 2003.

(51) Int. Cl.
*H01M 8/00* (2006.01)
*H01M 8/10* (2006.01)

(52) U.S. Cl. .............. 429/13; 429/31; 429/32

(58) Field of Classification Search ........... 429/13, 429/30, 31, 32
See application file for complete search history.

(56) References Cited

U.S. PATENT DOCUMENTS

| | | | |
|---|---|---|---|
| 6,562,496 B2 * | 5/2003 | Faville et al. | 429/13 |
| 6,670,061 B2 | 12/2003 | Iio et al. | |
| 6,680,136 B2 | 1/2004 | Mieney et al. | |
| 6,824,907 B2 * | 11/2004 | Sarkar et al. | 429/31 |
| 2003/0134169 A1 | 7/2003 | Sarkar | 429/31 |

OTHER PUBLICATIONS

International Search Report, PCT/A2004/001849, Mar. 2, 2005.

* cited by examiner

*Primary Examiner*—Patrick Joseph Ryan
*Assistant Examiner*—Thomas H. Parsons
(74) *Attorney, Agent, or Firm*—Graybeal Jackson Haley LLP

(57) ABSTRACT

This invention relates to controlling a load-following solid oxide fuel cell system such that the fuel cells in the system are operating within an acceptable electrochemical reaction efficiency. The system has a controller that is programmed to detect a load change on a fuel cell stack, and when the load decreases, reduces the fuel flow rate to the stack or deactivates one or more fuel cells in the stack such that the stack operates within an acceptable electrochemical reaction efficiency range corresponding to the decreased load; and when the load increases, the controller increases the fuel flow rate to the stack or activates fuel cells in the stack such that the stack operates within the acceptable electrochemical reaction efficiency range.

23 Claims, 7 Drawing Sheets

CONTROLLING SOLID OXIDE FUEL CELL OPERATION

PRIORITY CLAIM

This application claims priority from U.S. Provisional patent application No. 60/513,398, filed Oct. 21, 2003, which is incorporated herein by reference.

FIELD OF THE INVENTION

This invention relates to methods and apparatus for controlling the operation of a solid oxide fuel cell (SOFC) system.

BACKGROUND OF THE INVENTION

In general, an SOFC comprises a pair of electrodes (anode and cathode) that are separated by a ceramic, solid-phase electrolyte. To achieve adequate ionic conductivity in such a ceramic electrolyte, the SOFC operates at an elevated temperature, typically in the order of between about 700° C. and 1000° C. The material in typical SOFC electrolytes is a fully dense (i.e. non-porous) yttria-stabilized zirconia (YSZ) which is an excellent conductor of negatively charged oxygen (oxide) ions at high temperatures. Typical SOFC anodes are made from a porous nickel/zirconia cermet while typical cathodes are made from magnesium doped lanthanum manganate ($LaMnO_3$), or a strontium doped lanthanum manganate (also known as lanthanum strontium manganate (LSM)). In operation, hydrogen or carbon monoxide (CO) in a fuel stream passing over the anode reacts with oxide ions conducted through the electrolyte to produce water and/or $CO_2$ and electrons. The electrons pass from the anode to outside the fuel cell via an external circuit, through a load on the circuit, and back to the cathode where oxygen from an air stream receives the electrons and is converted into oxide ions which are injected into the electrolyte. The SOFC reactions that occur include:

Anode reaction: 

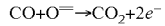

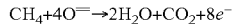

Cathode reaction: 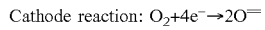

Known SOFC designs include planar and tubular fuel cells. Applicant's own PCT application Nos. PCT/CA01/00634 and PCT/CA03/00059 disclose methods of producing a tubular solid oxide fuel cell by electrophoretic deposition (EPD), metal electrodeposition (MED) and composite electrodeposition (CED). The fuel cell comprises multiple concentric layers, namely an inner electrode layer, a middle electrolyte layer, and an outer electrode layer. The inner and outer electrodes may suitably be the anode and cathode respectively, and in such case, fuel may be supplied to the anode by passing through the tube, and air may be supplied to the cathode by passing over the outer surface of the tube. The methods taught by these two applications are particularly useful for producing a small-diameter "micro" fuel cell that is suitable for powering small scale applications such as portable electronic devices.

Multiple fuel cells can be electrically and physically coupled together to form a stack to provide power to a load. In certain applications, the load can vary with time; various fuel cell systems have been proposed wherein the power supplied by the stack follows the varying load. When an SOFC stack output is following a varying load, there may be instances when the stack is not operating at an acceptable efficiency. For example, fuel utilization rates and fuel cell operating temperatures will change as the stack output changes, and may fall outside an acceptable operating range. It is therefore desirable to provide an operating strategy that enables a load-following fuel cell stack to operate in an efficient manner. Such operating strategy is particularly important where the fuel cell stack is used in a portable application where the fuel supply may be limited, and power management is an important consideration.

Also during operation, the fuel cells in the stack should be maintained within a particular temperature range in order to provide stable power output. Therefore, it is also desirable to provide balance of plant components for the stack and an operating strategy for the stack that maintains the stack within the desired operating temperate range, as well as within other desired operating parameters such as efficiency and fuel usage rates.

SUMMARY OF THE INVENTION

According to one aspect of the invention, there is provided a method of controlling the operation of a solid oxide fuel cell stack to maintain the stack within a selected efficiency range and fuel cells within the stack at a selected operating temperature range. The method comprises the followings steps:

(a) determining a load on the fuel cell stack;
(b) activating a sufficient number of fuel cell sub-stacks in a fuel cell stack to supply power at a selected operating efficiency to meet the load, by heating the activated sub-stacks to a selected operating temperature and supplying sufficient fuel and oxidant to the sub-stack to supply the power to meet the load; and
(c) heating at least one inactive sub-stack by burning unreacted fuel discharged from one or more activated sub-stacks, thereby maintaining the heated inactive sub-stack at a stand-by temperature, wherein the burning can occur within each heated inactive sub-stack.

Heating the activated sub-stack can be achieved by generating heat from an electrochemical reaction in the fuel cell of the activated sub-stack and by burning unreacted fuel in the activated sub-stack.

The method can also include determining the number of activated and heated inactive sub-stacks required to burn all of the unreacted fuel, then burning all the unreacted fuel in these activated and heated inactive sub-stacks. This procedures prevents any unreacted fuel from being discharged from the stack and into the atmosphere.

The method can also include monitoring the load. When a load change has been detected, the stack power is changed to follow the load change by changing fuel and oxidant flow rates to at least one activated sub-stack. When the stack power is not sufficiently changed by an increase in the fuel and oxidant flow rates to the at least one activated sub-stack, at least one heated inactive sub-stack can be activated.

The method can also include monitoring the temperature of at least one activated sub-stack. When the sub-stack temperature exceeds an upper temperature limit in a selected operating temperature range, the supply of unreacted fuel for burning, and/or the supply of fuel and oxidant to the fuel cells can be reduced for that sub-stack. Conversely, when the sub-stack temperature falls below a lower temperature limit in the range, the supply of unreacted fuel for burning and/or the supply of fuel and oxidant to the fuel cells can be increased for that sub-stack.

According to another aspect of the invention, there is provided a fuel cell assembly that is configured to maintain the operating temperature of fuel cells of the assembly within a selected temperature range. The fuel cell assembly comprises a plurality of fuel cell sub-stacks, each having at least one fuel cell and a burner therein. Each fuel cell in each sub-stack is coupled to an oxidant supply source and a fuel supply source. Each fuel cell in each sub-stack is also coupled to an unreacted fuel conduit which in turn is coupled to the burner in each sub-stack. Unreacted fuel discharged from the fuel cell thus flows through the unreacted fuel conduit, and can be directed to the burners in one or more sub-stacks to heat the sub-stacks.

A controller is communicative with actuators that control the flow of fuel and oxidant to the fuel cell and the burner. The controller is configured to operate the burner and the fuel cell in an activated sub-stack such that heat generated by the fuel cell and the burner are sufficient to maintain the fuel cell in the activated sub-stack within the selected operating temperature range. The controller also controls the flow of unreacted fuel from the activated sub-stack to the burner of the activated sub-stack, as well as to the burners of one or more inactive sub-stacks to heat the inactive sub-stacks to a stand-by temperature. The controller can be further configured to control the flow of fuel and oxidant to each fuel cell in each activated sub-stack in order to control the electrical and thermal output of the activated sub-stacks.

At least one of the fuel cells in each sub-stack can be optionally embedded in a continuous solid state porous foam matrix. Also, at least one fuel cell in each sub-stack can be enclosed in a thermally insulating housing.

In addition to burners, the fuel cell assembly can also optionally include a resistive heating element for providing heat to the fuel cell sub-stack. The resistive element is coupled to an electric power supply and is located in the vicinity of a fuel cell sub-stack.

DETAILED DESCRIPTION OF EMBODIMENTS OF THE INVENTION

Figure 1:
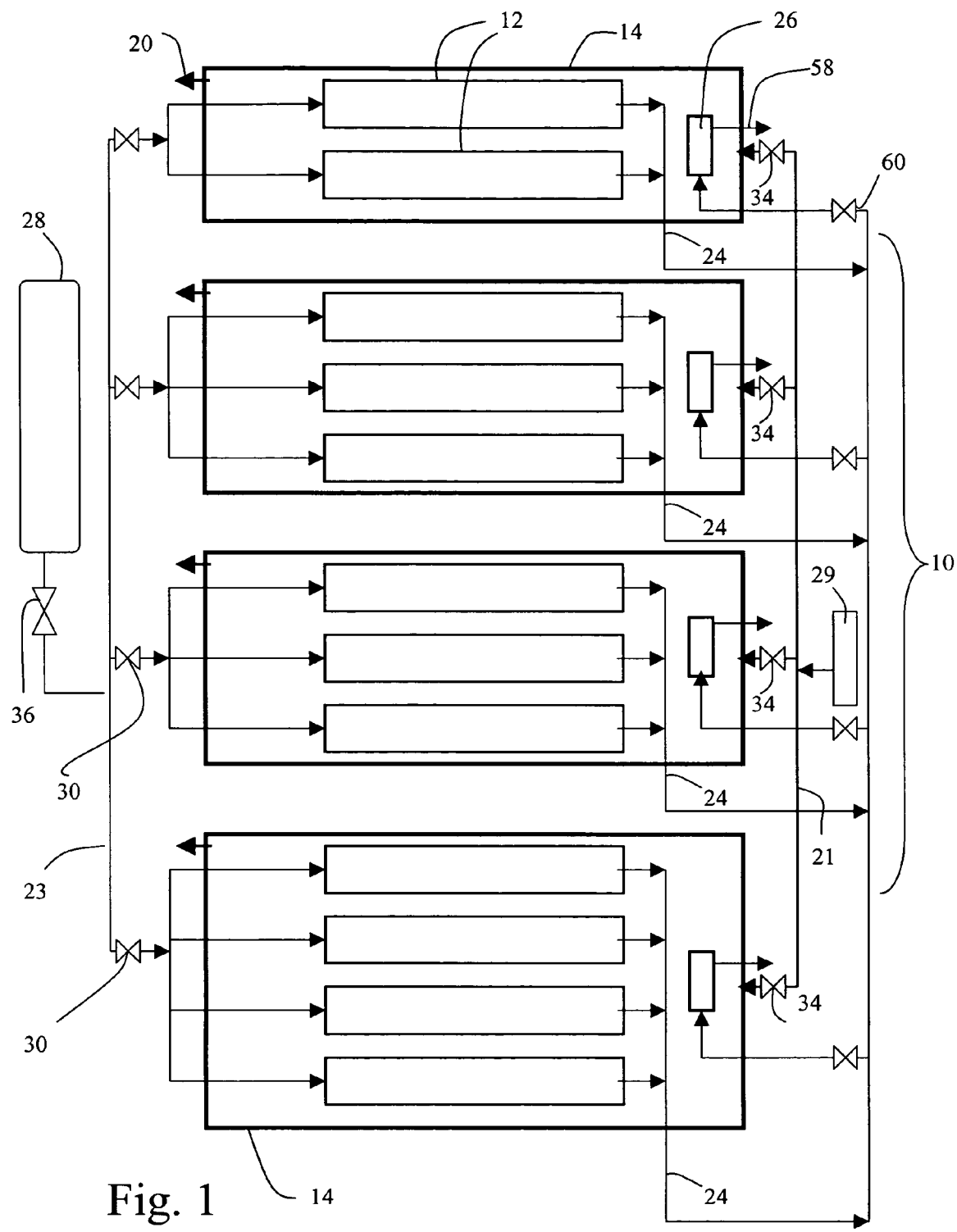
FIG. 1 is a reactant piping schematic for an embodiment of a micro SOFC stack having four independently controllable sub-stacks, illustrating the fuel and oxidant flow connections in the SOFC stack.

Referring to FIG. 1 and according to one embodiment of the invention, a fuel cell system 1 comprises a micro-SOFC stack 10 which in turn comprises a plurality of micro tubular solid oxide fuel cells 12. These fuel cells 12 have a diameter of between 0.5 mm to 5 mm and are manufactured according to the methods taught in applicant's published PCT applications PCT/CA01/00634 and PCT/CA03/00059. However, a fuel cell system having micro or larger fuel cells, manufactured by the same or different techniques can be provided if circumstances require. In particular, the fuel cells 12 have three tubular layers in concentric intimate contact, namely: a porous electronically and ionically conductive anode inner layer, a dense ceramic electrolyte middle layer, and a porous electronically and ionically conductive cathode outer layer.

The fuel cells 12 are grouped into a plurality of sub-stacks 14. In this embodiment the stack 10 comprises four sub-stacks 14 each having two, three, three and four fuel cells 12 respectively. However, the number of sub-stacks 14 and the number of fuel cells 12 in each sub-stack 14 can be varied depending on the system's power requirements. The sub-stacks 14 are electrically coupled in series in the stack 10; optionally, the sub-stacks 14 can be electrically coupled in parallel, or in a parallel and series combination (both not shown). The stack 10 has a pair of leads (not shown) that connect to and provide DC power to a DC load, such as a laptop computer. Optionally, the system 1 can include a DC/AC converter (not shown) coupled to the stack leads when the system 1 is intended to power A/C powered devices.

Figure 2A:
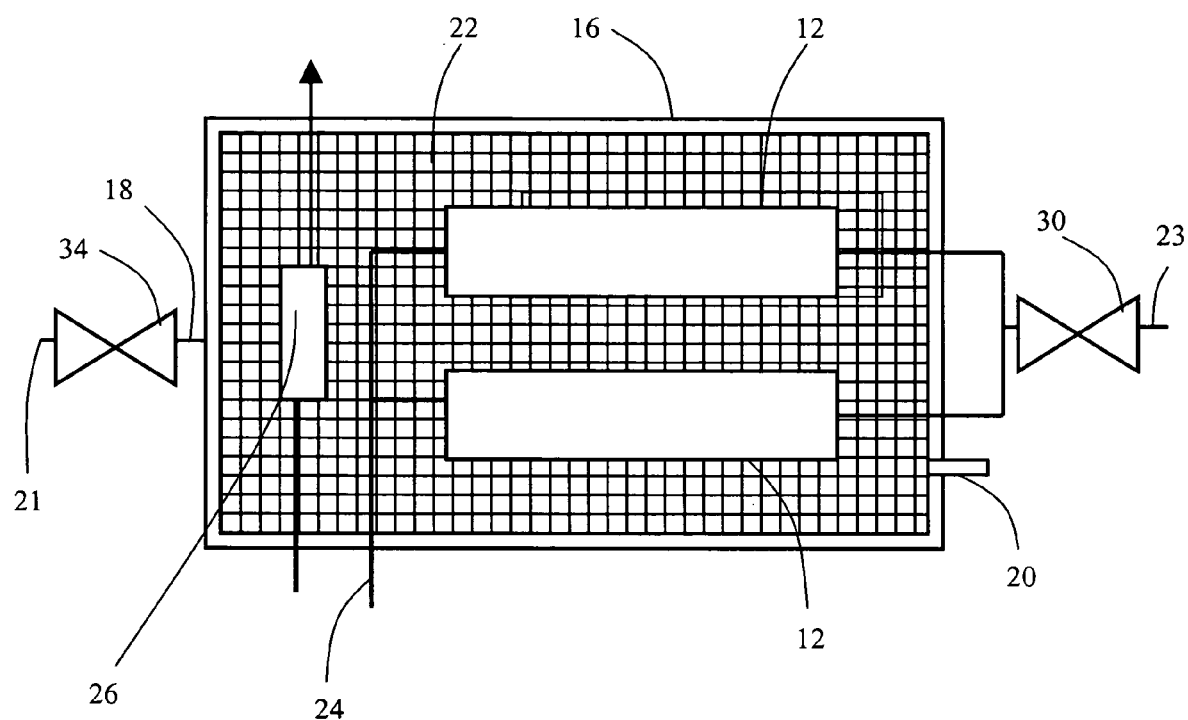
FIGS. 2(a) and (b) are schematic detail views of one of the sub-stacks of the SOFC stack illustrated in FIG. 1, with FIG. 2(a) showing a sub-stack having a hydrogen burner heating element, and FIG. 2(b) showing a sub-stack having an electric resistive heating element.

Referring to FIGS. 2(a) and (b), each sub-stack 14 has a thermally insulated oxidant chamber 16 with an oxidant supply port 18 and an oxidant discharge port 20. The oxidant chamber 16 can be made from Aspen Aerogel material to provide suitable thermal insulation. An oxidant supply conduit 21 is connected to the oxidant supply port 18. The oxidant can be air. The fuel cells 12 are embedded inside a solid state porous foam matrix 22 as taught in applicant's published PCT application no. PCT/CA03/00216. The matrix 22 can be made of an electronically conductive material and thus serve to collect current at the cathode side of the reaction, as well as providing mechanical support to the fuel cells 12. Alternatively, the fuel cells 12 can be fixed in place inside the oxidant chamber 16 with other means as known in the art, such as spacers (not shown). Each fuel cell 12 has a fuel inlet end and a fuel outlet end; a fuel supply conduit 23 is connected to the fuel supply end of each fuel cell 12, and a fuel discharge conduit 24 is connected to the fuel discharge end of each fuel cell 12. Alternatively, the fuel cells can be single ended (not shown), in which case the fuel supply and discharge conduits 23, 24 connect to the open end of the fuel cell 12.

The fuel can be gaseous hydrogen. However, other fuels in liquid or gaseous phases can be substituted, such as: methanol, butane, natural gas and other hydrocarbons suitable for SOFC use as is known in the art. A heating element 26 is located inside each oxidant chamber 16 and is used to heat the fuel cell 12 to a suitable operating temperature of between about 500-850° C. and preferably between about 750-850° C., especially during start-up and to maintain said fuel cell 12 within that temperature range. The heating element 26 as shown in FIG. 2(a) is a hydrogen burner 26. The burner 26 is connected to an unreacted fuel conduit 27 that receives unreacted fuel discharged from the fuel cells 12.

Referring back to FIG. 1, the fuel discharge conduit 24 for each fuel cell 12 is coupled to the unreacted fuel conduit 27. The unreacted fuel conduit 27 has a common manifold that receives unreacted fuel from each fuel discharge conduit 24. The common manifold has a plurality of headers that each couple to one of the burners 26, and a control valve 60 is located in each header; each control valve 26 controls the flow of unreacted fuel from the unreacted fuel conduit 27 to each burner 26.

Each burner 26 has a piezoelectric igniter (not shown) which is electrically connected to an electric power supply, such as a conventional electrochemical battery. The igniter creates a spark which ignites the unreacted fuel passing through the burner 26; the resulting combustion generates heat which heats the sub-stack 14 and the fuel cells 12 therein. Combustion products and unreacted fuel are discharged from the burners 26 and out of the sub-stack 14 and system 1 via a discharge conduit 58. Such hydrogen burners are known in the art and are thus not described in detail here; an example of a suitable known hydrogen burner is the type described in Jeongmin Ahn et al. "Gas-phase and Catalytic Combustion in Heat Recirculation Burners", Proceedings of the Combustion Institute, Vol. 30 (2004).

Figure 2B:
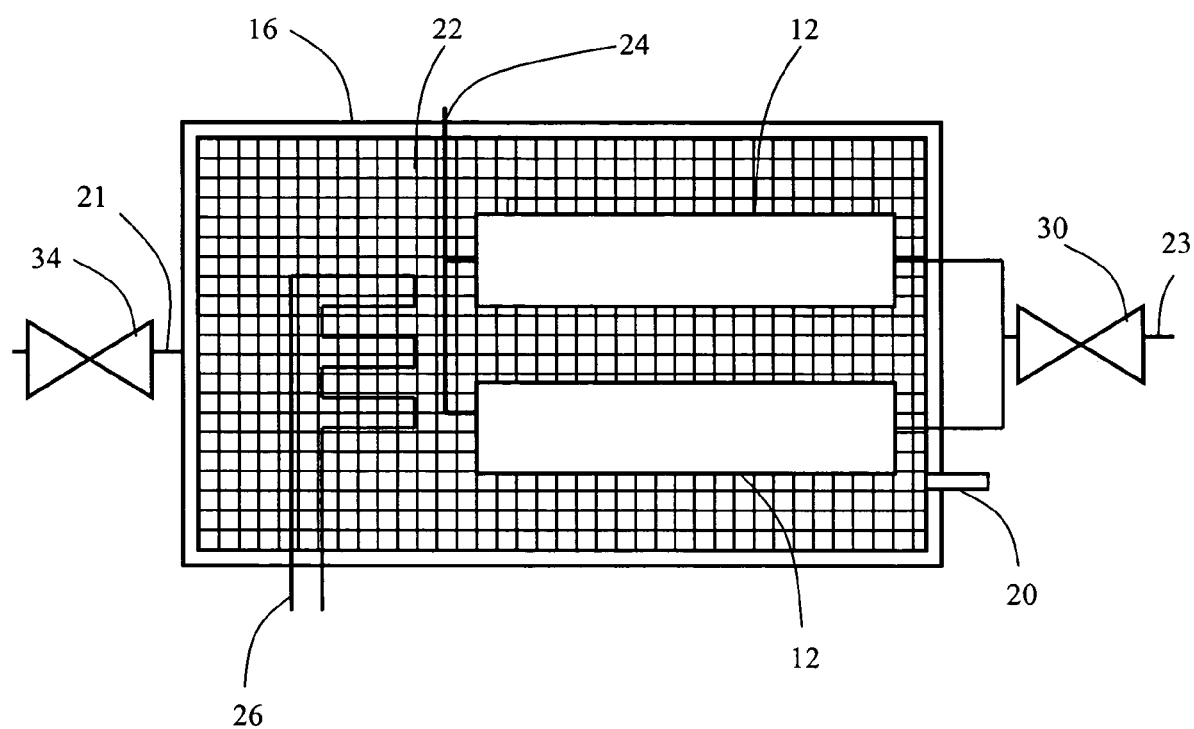

Alternatively and as shown in FIG. 2(b), the heating element 26 can be an electric resistive element that is electrically connected to the electric power supply. Such resistive element can operated separately or be combined with the burners 26 shown in FIG. 2(a) to jointly provide heat to the sub-stack 14.

Referring again to FIG. 1, the fuel supply conduit 23 of each sub-stack 14 is connected to a fuel supply container 28. This container 28 can be a gaseous hydrogen pressure tank, metal hydride tank or other suitable hydrogen container as is known in the art. When hydrogen gas is supplied under pressure from a pressurized container 28, no hydrogen pump is required; however, a pump (not shown) can be provided if higher fuel supply pressures and/or flow rates are desired, of if the fuel is not contained in a suitably pressurized container.

An air fan 29 is in fluid communication with the oxidant supply conduits 21, is connected to the electric power supply, and moves air into each oxidant chamber 16 as needed for the electrochemical reaction.

An electrical buffer (not shown) is electrically coupled to the fuel cell stack 10 as well as the load. The buffer can be a rechargeable electrochemical battery as known in the art; the buffer supplies power to the load on occasions when the load increases at a rate faster than the fuel cells 12 can respond, as well as serving as the power supply to the controller 32, heating element 26, fan 29 and other components of the system 1 when the power produced by the fuel cells 12 is insufficient to power said components. The buffer is recharged by the fuel cells 12, periodically or as needed.

A valve 30 is installed in each fuel supply conduit 23. Each valve 30 is separately controllable by a controller 32 (see FIG. 3) and may be for example a solenoid valve; this enables the supply of fuel to each sub-stack 14 to be independently controlled. Similarly, a controllable valve 34 is installed in each oxidant supply conduit 21 to enable the flow of oxidant to each sub-stack 14 to be independently controlled. A main fuel valve 36 is communicative with the controller 32 and is located on the fuel supply conduit 23 near the fuel container 28. The main fuel valve 36 can be a one way check valve that automatically closes when the fuel container 28 is removed from the system 1, and can also be actuated by the controller 32 to stop fuel flow from the container 28 when circumstances dictate, e.g. when the system 1 is shut down, or during an emergency.

Figure 3:
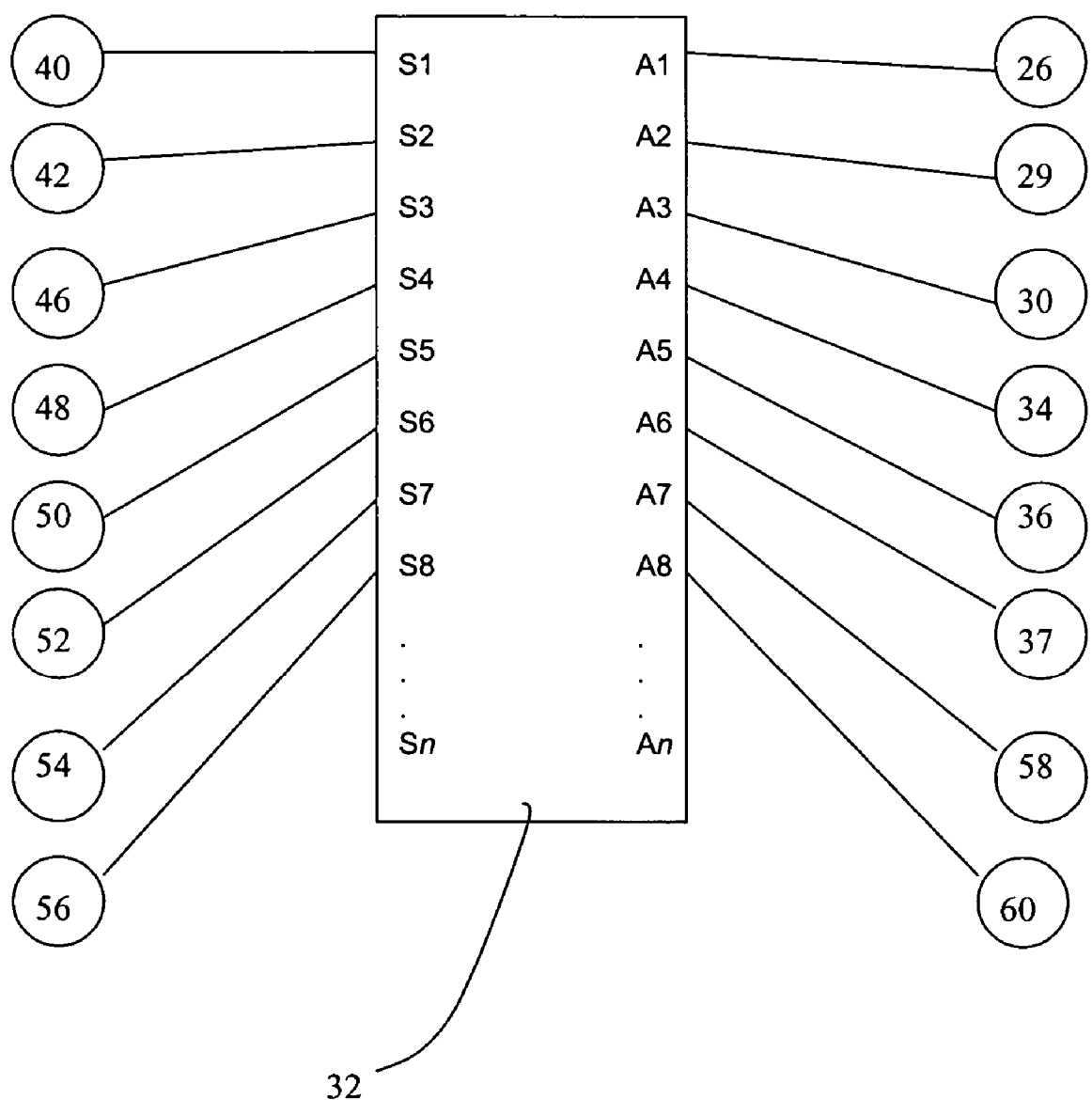
FIG. 3 is a controller schematic for the SOFC stack of FIG. 1 illustrating the communication connections between a controller and sensors and actuators of a sub-stack and other components in a fuel cell system.

Referring to FIG. 3, the controller 32 receives data from various sensors and controls the operation of the fuel cell system 1 by controlling the operation of various actuators. The actuators include the controllable valves 30, 34 in the fuel and oxidant supply conduits 21, 23, the main fuel valve 36, the burners 26, the fan 29, as well as a buffer switch 37. The buffer switch 37 electrically couples the buffer to the load when closed. The sensors include the following sensors for each sub-stack 14 (only the sensors for one sub-stack 14 are shown in FIG. 3 for the sake of clarity):

a voltage sensor 40;
a current sensor 42;
a temperature sensor 46;
fuel flow meter 48
oxidant flow meter 50;
fuel pressure sensor 52; and
oxidant pressure sensor 54.

The controller 32 is also communicative with a fuel level sensor 56 in the fuel container 28. The controller 32 is also communicative with the load. Where the load is a laptop computer, the controller 32 is communicative with the CPU of the computer, and receives data that can include the expected operating period of the laptop. For sake of illustration, the load will be a laptop computer for the remainder of this description; however it is to be understood that the system 1 can be electrically coupled to any electrically powered device(s).

Generally, the controller 32 is programmed to manage the operation of the fuel cell system 1 such that the fuel cells 12 are operating at an acceptable electrochemical reaction efficiency and within an acceptable operating temperature range. In particular, the controller 32 is programmed to activate the fuel cells 12 in one or more sub-stacks 14 by heating the fuel cells 12 to a suitable operating temperature, and maintain the activated fuel cells 12 within the operating temperature range, as well as maintain one or more inactive fuel cells 12 at a suitable stand-by temperature. The controller 32 is also programmed to maintain the fuel flow rates of the sub-stacks 14 within a target operating range that enables the fuel cells 12 in the sub-stacks 14 to operate at an acceptable electrochemical reaction efficiency.

The acceptable electrochemical reaction efficiency range for the fuel cell system 1 is $\geq 60\%$; the acceptable efficiency range can differ from system to system, as is evident to those skilled in the art. Although it is desirable for the fuel cell system 1 to operate at an ideal efficiency that is greater than 60%, such ideal efficiency can never be reached in real world fuel cell operation. To determine the operating parameters required for the fuel cell system 1 to operate within the acceptable electrochemical reaction efficiency range, and in particular the acceptable fuel flow rates, consider the following basic thermodynamic equations for reversible reactions:

$$\text{efficiency}=(\text{power output})/(\text{fuel usage}).$$

Also, fuel usage by the fuel cells 12 is determined by:

$$\text{fuel usage}=(\text{fuel supply})*(\text{fuel utilization})$$

Therefore, $$\text{efficiency}=(\text{power output})/((\text{fuel supply})*(\text{fuel utilization}))$$

The electrochemical reaction efficiency of the fuel cell system 1 can thus be controlled by controlling at least one of: power output, fuel supply, and fuel utilization. The power output of the stack is dictated by the external load, which can vary over time. Fuel supply can be controlled by controlling the rate of fuel flow to the fuel cells 12. However, fuel utilization cannot be directly controlled, as it is dependent on the construction and configuration of the fuel cell system, and must be determined empirically. Thus, when a fuel cell system including all the control components is built, a calibration procedure should be implemented to determine the relation between fuel utilization and different variables.

Under realistic operating conditions, the ideal fuel utilization of the system 1 shown in FIG. 1 is expected to be about 80-85%.

Fuel usage can be controlled by controlling the fuel supply, i.e. the fuel flow to the fuel cells 12. Therefore, the electrochemical reaction efficiency of the fuel cell system 1 can be controlled by controlling the fuel supply. Given the fuel utilization, and the power output (determined by the load imposed on the fuel cell system 1), the controller 32 can calculate the fuel supply range required for the fuel cell system 1 to operate within the acceptable electrochemical reaction efficiency range. When the load changes, the power output and fuel utilization changes, and thus the required fuel supply range will change. The controller 32 is thus programmed to determine the appropriate fuel supply range for a particular load, and adjust the fuel flow rates to fall within the appropriate fuel supply range.

At start-up, the fuel cells 12 are activated by first flowing oxidant and fuel to the fuel cells 12 via the oxidant and fuel supply conduits 21, 23. When the fuel cells 12 have not yet reached their operating temperature, the fuel is not reacted and flows out of the fuel cells 12 through the fuel discharge conduits 24, to the unreacted fuel conduit 27, then to the burners 26, which then ignite the fuel to generate heat that warms the fuel cells 12. When the fuel cells 12 are heated to a temperature above about 500° C., an electrochemical reaction takes place as is well known in the art, and electricity is produced, which is supplied to a load electrically connected to the leads of fuel cell stack 10.

During system start-up, the controller 32 is programmed to carry out the following steps: The controller 32 receives a start-up signal from the computer and the controller 32 actuates the buffer by closing the buffer switch 37 to supply power immediately to the computer, and determines the load demanded on the buffer 29 by the computer. The controller 32 then determines the number of sub-stacks 14 that have to be activated in order to provide the power output to meet this demand, and then opens the fuel and oxidant flow valves 30, 34 to an appropriate number of selected sub-stacks 14—the appropriate number of sub-stacks 14 is determined by calculating the number of sub-stacks 14 that need to be activated in order for the fuel flow rates to be within the acceptable fuel supply range corresponding to the measured load, thereby achieving the target operating efficiency. The controller 32 also actuates the burner(s) 26 for the selected sub-stack(s) 14 to be activated, by opening the associated control valve(s) 60 and actuating the associated igniters for the burner(s) 26. The burners 26 begin to heat the oxidant chamber 16 and the fuel cells 12 located therein. The controller 32 monitors the temperature inside the activated sub-stack(s) 14 and once the fuel cells 12 in the sub-stack(s) 14 reach a minimum operating temperature of about 500° C., electrochemical reaction in the fuel cells 12 begins and electricity is produced. Once sufficient electricity is being produced by the sub-stacks 14 to meet the demanded load, the buffer 26 is deactivated by opening the buffer load switch 37, and power to load is provided exclusively by the active sub-stacks 14.

The temperature of the fuel cells 12 will eventually reach a target operating temperature range of 750-850° C., as both the burners 26 and the fuel cells 12 themselves are generating heat. When active, the fuel cells 12 consume fuel for the electrochemical reaction, and thus less unreacted fuel reaches the burners 26, resulting is less heat being generated by the burners 26. The reduced heat from the burners 26 is off-set by the heat generated from the electrochemical reaction. The controller 32 is programmed to ensure that the heat generated by the fuel cell electrochemical reaction and the burners 26 maintains the fuel cells 12 within the target operating temperature range. The controller 32 can maintain the fuel cell temperature within this temperature range by controlling the rate of fuel and oxidant flows to the fuel cells 12 and the burners 26. Specifically, the controller 32 controls the oxidant flow rate by controlling the speed of fan 29, or by controlling oxidant flow valve 34. The controller 32 controls the fuel flow rate to the fuel cells 12 by controlling the fuel flow valve 30 associated with those fuel cells 12, and controls the fuel flow rate to the burners 26 by controlling the control valves 60 associated with those burners 26.

For example, if the fuel cell temperature of a particular sub-stack 14 is approaching the upper limit of the operating temperature range, the controller 26 can increase cooling of the sub-stack 14 by increasing the oxidant flow rate to the sub-stack 14, and/or reduce the fuel flow rate to one or both of the fuel cells 12 and the burner 26 in the sub-stack, thereby reducing fuel cell 12 and/or burner 26 heat output. The controller 26 can further reduce heat output by turning off the burner 26 altogether by deactivating the igniter within the burner 26 or stopping unreacted fuel flow to that burner 26. Conversely, when additional heat is required by the fuel cells 12 of a particular sub-stack 14, the controller 32 can increase both the oxidant and fuel flow rates to increase electrochemical reaction and corresponding heat output.

It is expected that the rate of unreacted fuel being discharged from the fuel cells 12 of the activated sub-stack 14 will provide more fuel than necessary for the burner 26 of that sub-stack 14 to maintain that sub-stack 14 within the target operating temperature range. Instead of venting excess unreacted fuel into atmosphere, this unreacted fuel can be directed to burner(s) 26 in one or more inactive sub-stacks 14 to maintain the fuel cells 12 in these sub-stack(s) 14 at an elevated "stand-by" temperature. This enables the fuel cells 12 in these sub-stack(s) 14 to be more quickly activated than sub-stacks 14 at ambient temperature.

The stand-by temperature is close to but below the minimum temperature at which electrochemical reaction within the fuel cells 12 begins, namely, between 300-500° C. and preferably at about 400° C. Accordingly, the controller 32 determines the unreacted fuel needed for the burner(s) 26 of the activated sub-stacks 14 to maintain the activated sub-stacks 14 at the target operating temperature, then actuates the control valve(s) 60 for those burner(s) 26 and directs the appropriate amount of fuel to those burner(s) 26. Then, the controller 32 determines how many inactive sub-stack(s) 14 can be kept at stand-by temperature with the remaining unreacted fuel, and then actuates the control valves 34, 60 to those sub-stack(s) 14 to direct oxidant and fuel to the burner(s) 26 of those sub-stack(s) 14. The controller 32 can also open the fuel supply valves to the heated inactive sub-stacks 14 and flow fuel through the fuel cells 12 of those sub-stacks 14 in order to prevent oxidation therein.

The burners 16 are expected to burn most of the unreacted fuel. When gaseous $H_2$ is used as the fuel, the combustion reaction is very fast and air is quite abundant, and thus the unburned exhaust $H_2$ fuel should be zero. When using fuels like methanol, the unburned amount of fuel should be minimal. Optionally, to prevent any unburned fuel from being released into the atmosphere, an additional, "general"

burner (not shown) can be installed downstream of the burners 16 to burn any fuel that was not burned by the burners 16.

When a stand-by sub-stack 14 needs to be activated, the controller 32 increases the reactant flows to one or more inactive sub-stacks 14 which causes the burners 26 therein to generate more heat and heat the fuel cells 12 to within the target operating temperature range. The controller 32 then actuates the fuel supply valve 30 for the stand-by sub-stack 14, to increase the fuel flow to the fuel cells 12. The electrochemical reaction then begins.

Figure 4:
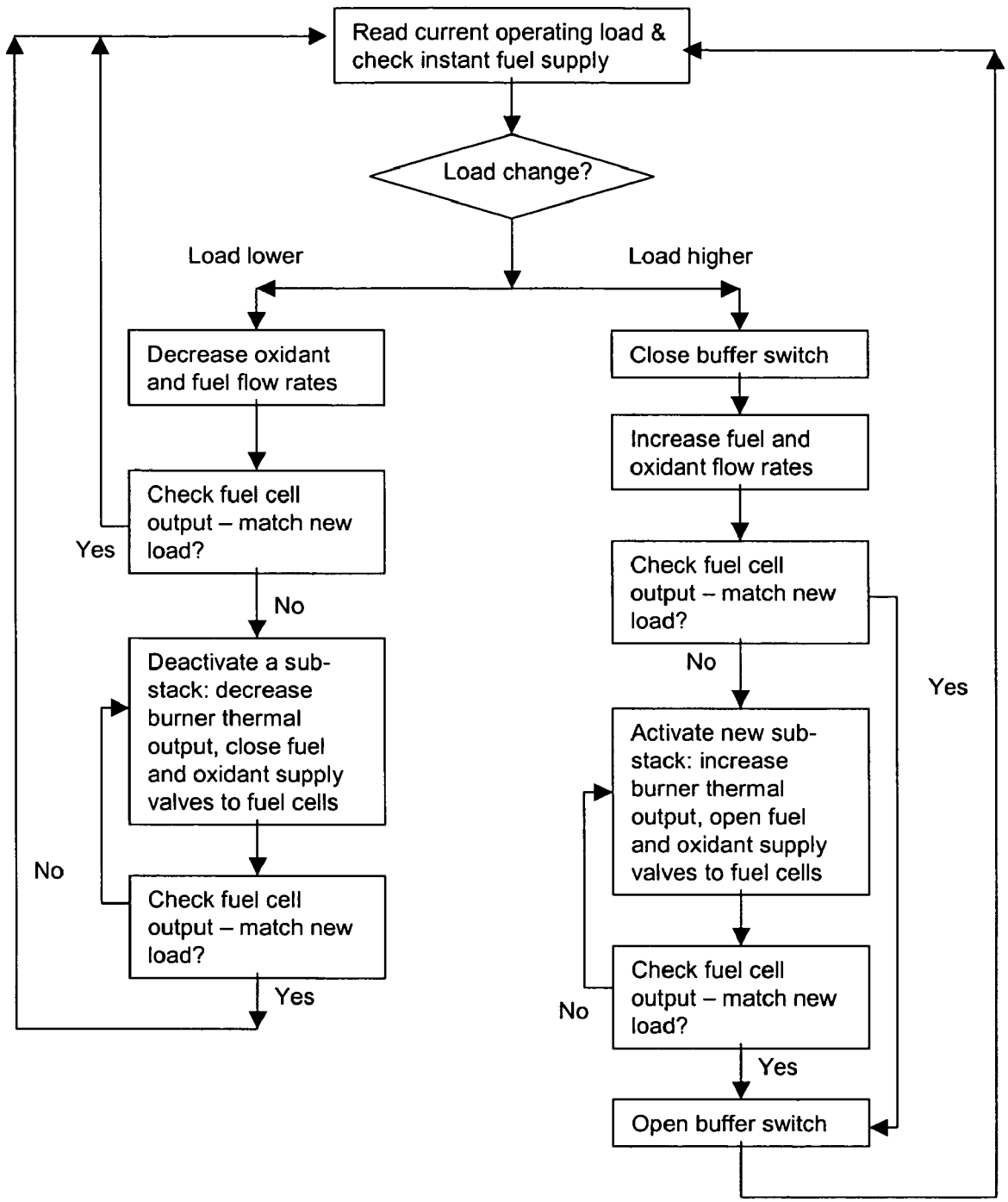
FIG. 4 is a controller operation flowchart illustrating a load-following operating strategy carried out by the controller.

When the operating load changes during operation, the controller 32 determines whether the fuel cell operating parameters have to be adjusted, and if yes, makes the necessary adjustments so that the stack output follows the load change. Referring to FIG. 4, the controller 32 determines the new operating load. When the load increases, the controller 32 closes the buffer switch 37 thereby supplying power immediately to meet the new load. The controller 32 then determines the new target operating parameters (i.e. fuel flow rates and sub-stack temperatures) corresponding to the new operating load, and adjusts the flow rates and/or temperatures of the instant activated sub-stacks 14 such that the fuel flow rates and temperatures are within the target operating range corresponding to the new operating load. Should the adjustments be insufficient to bring the system 1 within the target operating range, then additional sub-stacks 14 are activated accordingly. Once the fuel cells 12 produce sufficient power to meet the new load, the controller 32 opens the buffer switch 37.

When the load decreases, then the target operating range for the fuel flow rate will decrease. The controller 32 first actuates the fuel and oxidant supply valves 30, 34 to the active sub-stacks 14 to reduce the fuel and oxidant flow rates thereto, thereby reducing power output. Should the load have decreased so much that the reduction in power output would bring the active sub-stacks outside their target efficiency range, then the controller 32 deactivates one or more sub-stacks 14 until the remaining sub-stacks 14 can be operated efficiently. A sub-stack is deactivated by closing the fuel supply valve 30. The oxidant supply valve 34 and unreacted fuel control valve 60 can be kept open to operate the burner 26 and maintain the deactivated sub-stack 14 at stand-by temperature.

Figure 5:
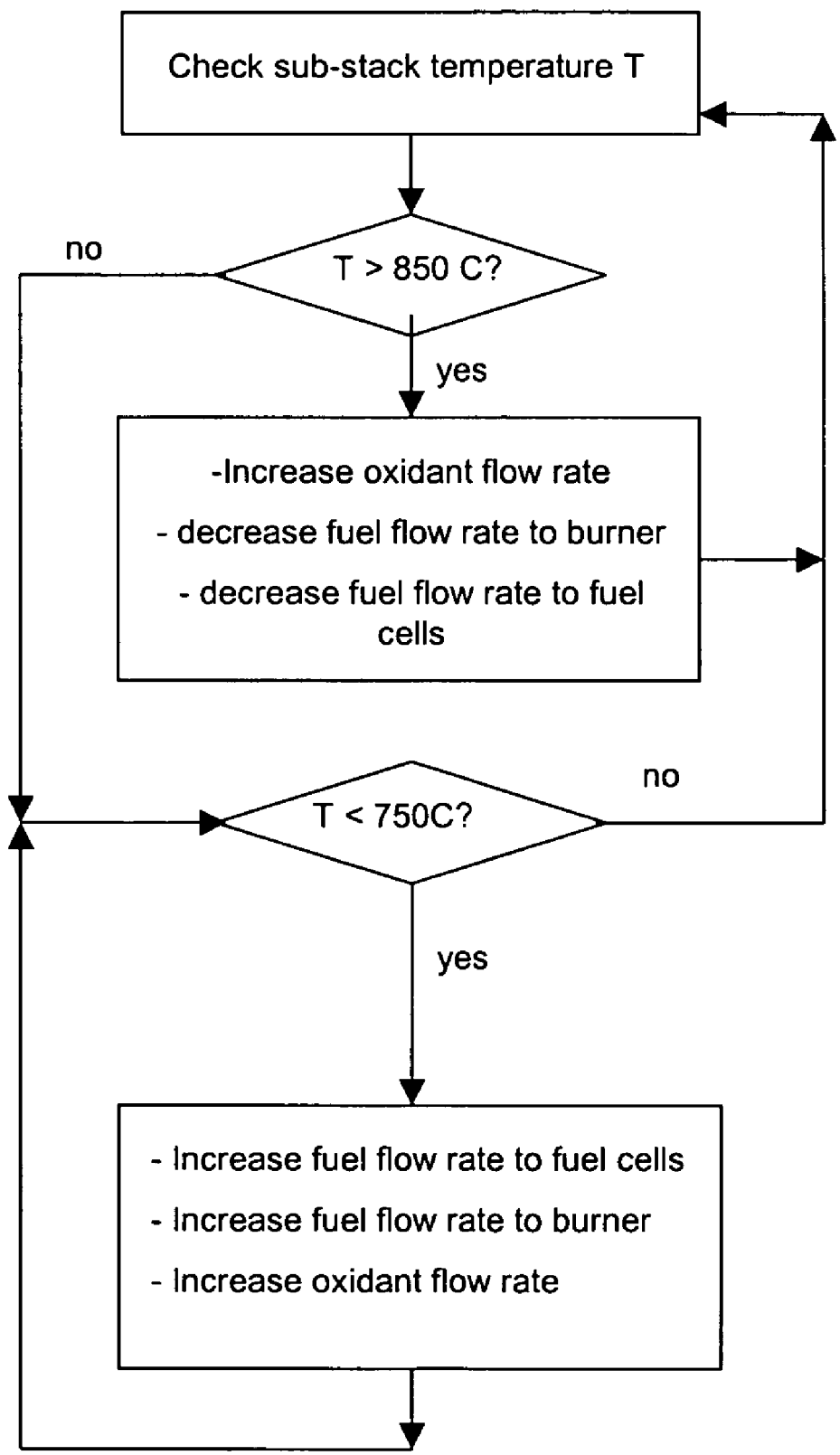
FIG. 5 is a controller operation flowchart illustrating a temperature management strategy carried out by the controller.

Referring to FIG. 5, the controller 32 monitors the temperature sensors in each sub-stack 14 and undertakes actions to keep the sub-stacks 14 within an target operating temperature range, which in this embodiment is between 750 and 850° C. Should the temperature of any activated sub-stack 14 exceed the target temperature range, the controller 32 first increases the flow rate of oxidant through the sub-stack 14 by increasing the speed of the fan 29 or increasing the oxidant supply valve 34 opening. The flow of oxidant serves to cool the fuel cells 12 by carrying heat out of the sub-stack 14. If the temperature still exceeds the target temperature range, the controller 32 actuates control valve 60 to reduce the fuel flow rate to the burner 14, thereby reducing the thermal output from the burner 14. If the temperature still exceeds the target temperature range, then the controller 32 actuates fuel supply valve 30 to reduce the fuel flow rate to the fuel cells 12, which causes the fuel cell electrical and thermal output to decrease; note that since electrical output is dependent on the external load, the change in fuel flow rate to the fuel cells 12 is not expected to significantly change the electrical output, but is expected to produce a significant change to thermal output. Optionally, control valve 60 can be shut to stop burner operation altogether.

Should the temperature of any activated sub-stack 14 drop below the new target temperature range, the controller 32 first actuates the fuel and oxidant supply valves 30, 34 to increase the fuel and oxidant flow rates to the fuel cells 12 thereby increasing thermal output from the fuel cells 12 (with minimal increase in electrical output). The additional fuel flow will result in additional unreacted fuel available, which can be directed to the burner 26 via control valve 60 to increase the burner's thermal output and contribute additional heat.

Figure 6:
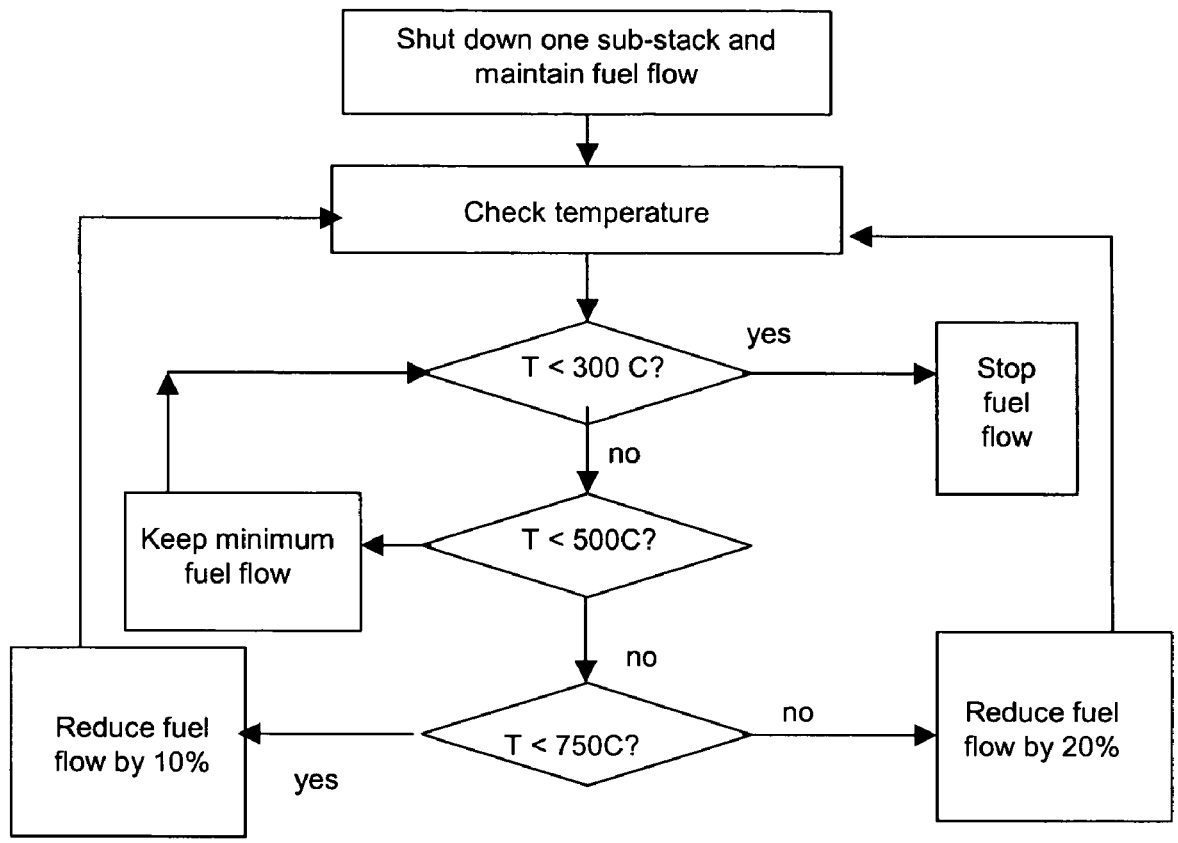
FIG. 6 is a controller operation flowchart illustrating a sub-stack shut down procedure carried out by the controller.

Referring to FIG. 6, the controller 32 is programmed to shut down a sub-stack 14 by reducing the fuel flow to the sub-stack 14 until the electrochemical reaction of the fuel cells 12 in the sub-stack stops. When the fuel cells 12 are above 700° C., the fuel flow rate is reduced by 20%; when the fuel cells 12 drop to below 700° C., the fuel flow rate is reduced by another 10%. When the fuel cells 12 drop below 500° C., the controller reduces the fuel flow rate to a minimum level that is sufficient to prevent the fuel cells 12 from being oxidized by air, which tends to occur above 300° C. Optionally (not shown in FIG. 6), when the fuel cells 12 drop below 400° C., the controller 32 activates the burners 26 to maintain the fuel cells 12 at a standby temperature of around 400° C.

In this embodiment, the four sub-stacks 14 each have a different number of fuel cells 12 (except sub-stack 14 two and three which both have three fuel cells 12) and thus produce a different output for a given operating condition. This enables the controller 32 to select the appropriate sub-stack(s) 14 for the load demanded. However, the number of sub-stacks 14 and the number of fuel cells 12 in each sub-stack 14 can be varied within the scope of the invention and depending on the needs of the user.

While the preferred embodiment of the invention has been illustrated and described, it will be appreciated that various changes can be made therein without departing from the scope and spirit of the invention.

What is claimed is:

1. A method of controlling operation of a solid oxide fuel cell stack comprising:
   (a) determining a load on a solid oxide fuel cell stack;
   (b) activating a sufficient number of fuel cell sub-stacks in the stack to supply power at a selected operating efficiency to meet the load; and
   (c) heating at least one inactive sub-stack in the stack by burning unreacted fuel discharged from at least one sub-stack, thereby maintaining the heated inactive sub-stack at a stand-by temperature.

2. A method as claimed in claim 1 wherein the activating of the sub-stacks comprises heating the activated sub-stacks to a selected operating temperature and supplying sufficient fuel and oxidant to the activated sub-stacks to supply the power that meets the load.

3. A method as claimed in claim 2 wherein the burning occurs within each heated inactive sub-stack.

4. A method as claimed in claim 3 wherein heating the activated sub-stack comprises generating heat by an electrochemical reaction in the fuel cell of the activated sub-stack and burning unreacted fuel in the activated sub-stack.

5. A method as claimed in claim 4 further comprising determining the number of activated and heated inactive sub-stacks required to burn all of the unreacted fuel, then burning all the unreacted fuel in these activated and heated inactive sub-stacks.

6. A method as claimed in claim 2 further comprising monitoring the load and when a load change has been detected, changing the stack power to follow the load change by changing fuel and oxidant flow rates to at least one activated sub-stack.

7. A method as claimed in claim 6 further comprising activating at least one heated inactive sub-stack when the stack power is not sufficiently changed by an increase in the fuel and oxidant flow rates to the at least one activated sub-stack.

8. A method as claimed in claim 2 further comprising monitoring the temperature of at least one activated sub-stack and when the temperature falls outside a selected operating temperature range, reducing the supply of unreacted fuel for burning in the monitored activated sub-stack when the temperature exceeds an upper temperature limit in the range, and increasing the supply of unreacted fuel for burning in the monitored activated sub-stack when the temperature falls below a lower temperature limit in the range.

9. A method as claimed in claim 2 further comprising monitoring the temperature of at least one activated sub-stack and when the temperature falls outside a selected operating temperature range, reducing the supply of fuel and oxidant to fuel cells of the monitored activated sub-stack when the temperature exceeds an upper temperature limit in the range, and increasing the supply of fuel and oxidant to fuel cells of the monitored activated sub-stack when the temperature falls below a lower limit in the range.

10. A method as claimed in claim 2 further comprising flowing fuel to fuel cells in the heated inactive sub-stacks, and using unreacted fuel discharged from the heated inactive sub-stacks for burning.

11. A fuel cell assembly for supplying power to a load at a selected efficiency and within an operating temperature range, comprising
(a) a plurality of fuel cell sub-stacks, each having at least one solid oxide fuel cell and a burner, each fuel cell in each sub-stack coupled to an oxidant supply source and a fuel supply source;
(b) an unreacted fuel conduit coupled to each fuel cell and to the burner in each sub-stack, such that unreacted fuel discharged from the fuel cell of one sub-stack can be flowed through the unreacted fuel conduit and can be directed to the burners in one or more sub-stacks to heat the sub-stacks.

12. A fuel cell assembly as claimed in claim 11 further comprising actuators that control the flow of fuel and oxidant to the fuel cell and the burner, and a controller communicative with the actuators, the controller configured to control the flow of oxidant and fuel to the fuel cell in an active sub-stack such that the fuel cell operates at a selected efficiency.

13. A fuel cell assembly as claimed in claim 12 further comprising actuators that control the flow of fuel and oxidant to the fuel cell and the burner, and a controller communicative with the actuators, the controller configured to control the flow of oxidant and fuel to the burner and the fuel cell in an active sub-stack such that the heat generated by the fuel cell and the burner are sufficient to maintain the fuel cell within a selected operating temperature range.

14. A fuel cell assembly as claimed in claim 13 wherein the controller is further configured to control the flow of unreacted fuel from the active sub-stack to the burner of the active sub-stack as well as to the burner of one or more inactive sub-stacks, such that the one or more inactive sub-stacks are heated by the burners to a stand-by temperature.

15. A fuel cell assembly as claimed in claim 13 wherein the controller is further configured to determine the number of active and heated inactive sub-stacks required to burn all of the unreacted fuel, and to burn all the unreacted fuel in these active and heated inactive sub-stacks.

16. A fuel cell assembly as claimed in claim 13 wherein the controller is further configured to monitor the load and when a load change has been detected, to change the stack power to follow the load change by changing fuel and oxidant flow rates to at least one active sub-stack.

17. A fuel cell assembly as claimed in claim 16 further wherein the controller is further configured to activate at least one heated inactive sub-stack when the stack power is not sufficiently changed by an increase in the fuel and oxidant flow rates to the at least one active sub-stack.

18. A fuel cell assembly as claimed in claim 13 wherein the controller is further configured to monitor the temperature of at least one active sub-stack and when the temperature falls outside a selected operating temperature range, to reduce the supply of unreacted fuel for burning in the monitored active sub-stack when the temperature exceeds an upper temperature limit in the range, and to increase the supply of unreacted fuel for burning in the monitored active sub-stack when the temperature falls below a lower temperature limit in the range.

19. A fuel cell assembly as claimed in claim 13 wherein the controller is further configured to monitor the temperature of at least one active sub-stack and when the temperature falls outside a selected operating temperature range, to reduce the supply of fuel and oxidant to fuel cells of the monitored active sub-stack when the temperature exceeds an upper temperature limit in the range, and to increase the supply of fuel and oxidant to fuel cells of the monitored active sub-stack when the temperature falls below a lower limit in the range.

20. A fuel cell assembly as claimed in claim 13 wherein the controller is further configured to determine the heat required from the burner in the active sub-stack then direct enough unreacted fuel to the burner of the active sub-stack to provide the required heat, then direct the remaining unreacted fuel to at least one inactive sub-stack for heating to a stand-by temperature.

21. A fuel cell assembly as claimed in claim 11 wherein the at least one fuel cell in each sub-stack is embedded in a continuous solid state porous foam matrix.

22. A fuel cell assembly as claimed in claim 21 wherein the at least one fuel cell in each sub-stack is enclosed in a thermally insulating housing.

23. A fuel cell assembly as claimed in claim 11 further comprising a resistive heating element coupled to an electric power supply and located in the vicinity of a fuel cell sub-stack, for providing heat to the fuel cell sub-stack.

* * * * *